United States Patent [19]

Kjersem et al.

[11] Patent Number: 5,660,141

[45] Date of Patent: Aug. 26, 1997

[54] PROCESS AND ARRANGEMENT FOR THE SUPPLY OF WATER TO A POND

[76] Inventors: Geir Kjersem, Våkleiva 124, N-5062 Bønes; Karsten Aubert, Storheia 23, N-5046 Rådal; Gunnar Furnes, Fanakrå 25, N-5047 Fana; Freddy Frydenbø, Storheia 40, N-5046 Rådal, all of Norway

[21] Appl. No.: 374,545

[22] PCT Filed: Jul. 15, 1993

[86] PCT No.: PCT/NO93/00116

§ 371 Date: Jan. 19, 1995

§ 102(e) Date: Jan. 19, 1995

[87] PCT Pub. No.: WO94/02005

PCT Pub. Date: Feb. 3, 1994

[30] Foreign Application Priority Data

Jul. 20, 1992 [NO] Norway ........................... 922866

[51] Int. Cl.⁶ ..................................................... A01K 63/00
[52] U.S. Cl. .................................... 119/223; 119/228
[58] Field of Search ............................. 119/217, 223, 119/224, 225, 228, 229

[56] References Cited

U.S. PATENT DOCUMENTS

| 4,655,169 | 4/1987 | Ola ................................. 119/228 |
| 4,711,199 | 12/1987 | Nyman . |
| 4,798,168 | 1/1989 | Vadseth et al. .................... 119/223 |

FOREIGN PATENT DOCUMENTS

| 216158 | 12/1984 | German Dem. Rep. ............. 119/228 |
| 1913703 | 3/1969 | Germany . |
| 4222532 | 8/1992 | Japan ................................. 119/224 |
| 7314931 | 1/1975 | Netherlands ........................ 119/217 |
| 109633 | 10/1966 | Norway . |
| 864439 | 11/1986 | Norway . |
| 159512 | 10/1988 | Norway . |
| 160753 | 2/1989 | Norway . |
| 169751 | 4/1992 | Norway . |
| 2242140 | 9/1991 | United Kingdom ................. 119/228 |
| WO88/03363 | 5/1988 | WIPO . |
| WO90/03729 | 4/1990 | WIPO . |

OTHER PUBLICATIONS

Publcation "Norsk Fiskeoppdrett" No. 3/86, pp. 30–33 & 20.

Primary Examiner—Todd E. Manahan
Attorney, Agent, or Firm—McAulay Fisher Nissen Goldberg & Kiel, LLP

[57] ABSTRACT

An apparatus for breeding fish comprises a pool having an impervious annular outer wall for floating in a body of water. A water distributor is located in an upper portion of the pool for directing the flow of water into the pool to set the volume of water in the pool into a rotating motion. An exhaust is located in the bottom of the pool for the free flow of water and debris from the pool into the surrounding body of water. The water distributor includes a regulating handle for changing the direction of flow of the water from the distributor to regulate the speed of the rotating volume of water in the pool.

14 Claims, 3 Drawing Sheets

PROCESS AND ARRANGEMENT FOR THE SUPPLY OF WATER TO A POND

The present invention relates to a process and an arrangement for the supply of water to a closed pond for the breeding of fish.

The invention is of particular concern with a pond type which is arranged to float in water, such as fresh water or sea water, for breeding fish, such as salmon and trout, but can also be adapted for a land-based installation.

For breeding fish in the sea, it is usual to employ open ponds which consist of a net bag and associated floating bodies besides. The open net bag causes fresh sea water continuously and by means of currents and waves to move through the net bag. In this way, fish which are held within the net bag, necessarily supplied by sea water, are safeguarded. A breeding installation consists as a rule of several separate ponds.

The breeding of fish in open ponds has been found to involve a series of problems. It is difficult to control the environment for the fish. Water temperature, salinity and oxygen content of the sea water will be variable over the year and during the course of a day. In addition algae have good growth conditions in the spring and summer. Some algae types are poisonous and fatal to fish. Also salmon lice often exist in open breeding installations. The operation of open breeding installations at sea often leads over time also to a stress of the environment in the vicinity of the installation. This stress is due to organic waste in the form of residues of fish feed, plus solid or liquid excrement from the fish. Organic waste which lies on the sea bottom in the vicinity of the breeding installation will over time decay. Problems of pollution from fish breeding are described in a series of newspaper articles and professional articles, including the Norwegian newspaper "Bergens Arbeiderblad", 12 Oct. 1988, page 9. The problems with breeding in open ponds exhibit themselves in the form of various diseases the in fish. Diseases can be spread by infection being transmitted from one installation to another. These diseases often lead to heavy mortality among fish and consequent difficulties with the economic operation of open breeding installations.

Solving of the problems of breeding based on floating, open ponds have been attempted by constructing closed installations, on land or at sea. By closing the installations, the possibility is reduced of both sickness, and the danger of transmitting disease between the installations. Land-based breeding installations consist of several closed breeding vats. The environment for the fish is improved by the stable temperature, salinity and oxygen content of the supplied sea water. This is achieved when the intake of sea water is placed deeply, for example at 30 to 50 m water depth. The water is pumped up and distributed to the breeding vats. The effluent water from the breeding vats can be dealt with separately and solid materials and the like can be filtered off before the water is led back to the sea.

Experiences with land-based breeding installations have shown however that this type of installation also has problems. The problems are primarily associated with high investment and operation costs. High investments are due to large installation costs in the form of the arrangement of building sites, pump stations, water distribution systems, etc. High operation costs are due for one thing to expenses for electricity because large quantities of sea water are to be pumped to a large lifting height, often more than 10 m. In order to reduce the quantity of water, oxygen can be supplied, but the supply of oxygen is difficult and associated with problems. Experiences with the operation of a land-based breeding installation are described in the publication "Fiskets Gang", week 50, 1988, page 7.

An alternative to land-based installations is to construct closed, floating breeding installations. Proposals for such installations are for example described in the Norwegian newspaper "Aftenposten", 2 Feb. 1989, page 64 and in the Norwegian newspaper "Bergens Tidende", 29 Apr. 1987, page 32. As for land-based installations, sea water will be fetched from the deep in order to stabilise the breeding environment for the fish. Compared with land-based installations, this type of installation is more reasonable. The operation costs are also lower because for one thing the expenses for electrical pump energy go down with lower lifting heights for the water.

Floating breeding installations having closed ponds have however proved to have problems both with respect to floating stability and operation. A proposal for improving the floating stability of this type of installation is for one thing mentioned in Norwegian Patent No. 162693.

Fish in closed breeding vats are often close in order to utilise investment in breeding volume to the maximum. On the termination of a breeding cycle, where the fish are ready for slaughter, the quantity of biomass fish relative to the volume of water in the vat can become extremely high.

Examples of closed breeding vats are evident from Norwegian Patent Application 864439 and Norwegian Patent Specification 109,633. These said patent publications mention various designs of breeding vats, combined with regulatable nozzles. Norwegian Patent Application 864439 discloses a rectangular breeding vat, while Norwegian Patent Specification 109,633 shows a hexagonal design. Both patent specifications disclose nozzles as suggestions for spreading of the water within the breeding vat in order to achieve good distribution of the water. The use of nozzles for obtaining good distribution of water is well known in the breeding industry, as well as other industries. Proper distribution of the water alone however is not enough, if the amount of water which is supplied, is not sufficient. The disclosed solutions will give problems in getting sufficiently large quantities of water supplied, something which is necessary in order to create well-being for the fish, at the same time as being able to achieve good economic operation in that the fish can grow quickly and can yield little sickness. The problems are due to the solutions being dependent upon either using an overflow or using valves in order to regulate the level of the water within the breeding vat. This creates problems in achieving a sufficient current of water through the pond. An overflow produces low static pressure heights, while a valve means that the water in the outlet is intermittently stopped when the valve closes something which in turn means that the volume of water will have accelerate when the valve opens again. This takes time and delays the flow of water. Experiences from operating closed breeding installations show that a deficient flow of water must be compensated for by the use of oxygen. This will improve the situation somewhat, but nevertheless does not solve the problem of getting rid of waste substances in the water, both solid and dissolved, something which can only be ensured by an abundant supply of water.

In addition: valves and overflow entail excrements, dead fish and other solid, organic waste from the operation being readily collected and involve a reduction in quality of the water within the breeding vat. On large floating breeding ponds additional problems arise since valves and other mechanical arrangements which require maintenance and inspection, are far below the water surface and are accessible with difficulty. In Norwegian Patent Specification 160,753 the problem of pollution is proposed to be solved by dividing the current of water so that solid waste is led towards the bottom and the remainder of the effluent water is removed in a separate outlet. The problem with this solution is that organic waste from the operation of the breeding installations consists of various materials such as dead fish, feed residues, solid excrements. These contributions will perform differently in the water, and can consequently be difficult to separate as indicated. In addition, the problem is not solved with dissolved organic substances, which can only be reduced by large and sufficient water replacement. The use of valves or overflow will further complicate the operation of a breeding container as indicated. Norwegian Patent Applications 854467 and 884542 and Norwegian Laid Open Specification 160.752 also point out different ways to solve the problems with solid waste, but these also will require the employment of an overflow or valves in order to be able to function.

Norwegian Patent Specification 169.751 and German Open to Public Specification No. 1,913,70 disclose the use of valves, filters and other mechanical arrangements for safeguarding the quality of the water in a closed breeding vat. The use of mechanical systems below water is problematic as regards access and maintenance, in addition to restrictions arising relating to the replacement of water, something which will affect the water level within the pond.

An article in the periodical "Norwegian Fish Breeding" No. 3/86, gives a professional survey of the design of different types of vat and dam, which can be used for the breeding of fish. The article is of a general character, and does not touch upon particular problems associated with the regulation of the water supply, where valves or overflow pipes have been employed hitherto in order to ensure a stable and controlled filling and operation of the pond or breeding vat.

Even if the regulation of a current of water into and out of a floating, closed pond will be very simple in principle, problems arise of an operational character with the flow of water when one simultaneously takes into consideration the breeding fish which are present within the closed pond. Experience shows that the correct water supply is extremely important to a successful operation of a closed installation. Breeding fish grow best and have the best well-being when the environment is good and the water supply is stable and correctly dosed. If the water supply and the speed are too large, the fish become stressed and reduce the intake of feed. If the water supply is too small, the lack of oxygen and excess of ammonia will be able to arise in the water. In addition, it is necessary that the water in the closed pond or vat is fresh and as far as possible free of infectious substances.

The water level (or the water height) in closed installations has been regulated hitherto either by overflow pipes in the surface of the water or by exhaust valves at the bottom. In breeding installations on land, for both salmon fry and salmon, the height of water for example is maintained constant in the breeding vat in that water is led out of the vat through an overflow pipe placed in the center of the vat. In floating, closed ponds, an exhaust valve has been placed in the bottom of the closed pond as an alternative. This valve can for example be pressure regulated and will open and close so that the height of water within the closed pond, is maintained constant.

Experience from the operation of breeding installations, open and closed, has shown that it is extremely important to remove feed residues, excrements and dead fish from the pond or the vat. If this organic waste remains lying and hence exposed to decay, this can cause a lack of well-being and sickness among the fish. In closed installations, where the replacement of water is often less than in open installations, the removal of organic waste has proved to be particularly important. In small breeding vats for salmon fry on land having a depth of up to 2 meters, and which have overflow pipes, one can for example prevail with suitable suction devices for the removal of the waste.

In floating, closed ponds the removal of the organic waste, combined with the regulation of the water flow in the closed pond, has proved to be problematic. For economic reasons it is an advantage that the closed, floating pond is relatively large, usually with a diameter of 10–12 meters and a depth of 20 meters. The organic waste, both feed residues, excrements and dead fish will fall towards the bottom of the pond. By virtue of the large depth it is difficult to prevail with suitable devices for the removal of the organic waste.

By using valves in the bottom of the closed, floating pond it has been found that dead fish, and thereafter other organic waste, deposit themselves over the exhaust valve. Gradually this leads to blockage of the exhaust valve. In order to clean up, it can consequently be necessary to employ divers (frogmen). In addition to this being awkward and unpractical, diving over time will be able to result in reduced food intake and possible sickness among the fish, because the fish are frightened and become stressed. An exhaust valve has in addition the significant disadvantage that it is a moveable, mechanical arrangement which will require inspection and maintenance. If the valve is stopped up, or ceases to function in another way, an extremely critical situation will rapidly arise for the fish which are located within the closed pond. The fish are dependent upon a continuous flow of water in the pond in order to be able to survive.

By using overflow pipes, instead of valves, as exhausts of the water from the pond, experience has shown that the waste will remain lying on the bottom, because the intake of the overflow pipe is located at the surface level within the closed pond. In order to remove the organic waste in a floating, closed pond with this type of exhaust it has also been necessary at times to have the assistance of divers.

Floating, closed ponds are as a rule circular or substantially circular. It is then usual to introduce the water tangentially at the wall of the pond. This is done in order to achieve a circular flow of the water within the pond. The circular flow is favourable in order to obtain a good local mixing of the water within the closed pond. This increases the well-being of the fish. The fish can thereby stand stationary in the pond, at the same time as it swims against the current. A disadvantage with the circular flow is however that a strong eddy current is formed in the exhaust. This eddy current reduces the quantity of the water which escapes through the exhaust. When the water flow capacity in the pond is reduced the quantity of breeding fish must also be reduced. The total quantity of breeding fish which can be held in the closed pond will be proportional to the water flow and access of oxygen in the water. A low capacity of water flow will therefore produce a poor economic operation.

Experience and practical tests have shown besides that problems arise with overfilling of a floating, closed pond in which valves are employed in the exhaust or overflow, if the water circulates far too quickly within the pond. Furthermore this will involve the eddy current in the center of the pond developing to become particularly strong. This leads in turn to less water flowing out of the exhaust, whether this is located in the bottom or in the form of an overflow pipe in the top. The height of the water within the pond will increase as a result. Overfilling of the floating, closed pond can become so large that the pond is drawn down in the sea until the water in the pond runs over the edge of the pond. This can produce large and adverse strains on the pond. In addition water which runs over the edge of the pond is of little use for the breeding of fish within the pond.

International patent application WO-A-90/03729 describes a closed pond with a circular cross section wherein water is circulated. In addition, the pond has an exhaust which comprises an overflow pipe. A well is also positioned in the bottom of the pond for collecting solid excrements, dead remains and other impurities. These collected materials and impurities can be removed by a suction pump. In addition, air can be introduced into the circulating water to minimize the quantity of fresh water support.

However, there are several disadvantages with the system described in WO-A-90/03729. Because of the low water exchange, the content of ammonia, urine and other dissolvable organic compounds will increase, creating a poor environment for the fish. A correct oxygen level does not compensate for this poor environment. Further, considerable amounts of excrements will have a gravity close to that of water and will remain in the water until discharge. This excrement will contribute to the poor quality of the water in the enclosed pond. Thus, if the water supply is increased, it will not be possible to collect the solid excrements from the well bottom.

It is an object of the present invention to provide a process and arrangement with which the afore-mentioned disadvantages in the previously known solutions, are totally or partially eliminated.

The process according to the invention for the supply of water to a closed pond for the breeding of fish, is characterised in that the level of water within the pond is controlled by regulating the speed of the rotational movement of the water, and that the water is led free flowing out of the pond through an exhaust designed in the bottom portion of the pond.

The speed of rotation, and thereby the water level within the pond, are preferably regulated by conducting the supplied water at regulatable angles relative to the volume of water in the pond in one or more water jet directions. The supply direction(s) is/are changed by controlling water guide means at the intake of the water to the pond. The speed of rotation can also be regulated by changing the inflow volume of the water.

According to another embodiment of the invention the rotating motion of the water is transformed forwards towards the exhaust into a substantially vertical rectilinear motion. The vertical motion can be produced by causing the rotating water to flow against guide plates. The water exhaust is preferably arranged approximately in the center of the pond.

On starting up the operation of the pond, water is supplied preferably in essentially one specific direction, such as in a tangential, horizontal direction, for rapidly establishing a rotational motion in the water, and also in order to fill the pond with water. When the pond has achieved the desired water level, a portion of the inflowing water is conducted in another direction, such as countercurrent, in order to produce a stable operative condition with respect to water distribution, water level and rotational speed. With the process according to the invention there has been achieved with a pond having a total pond water volume of about b 1300m$^3$ a water flow of up to 100 m$^3$ per minute, regulated according to the biomass of the fish in the pond. This is a water flow which is 10 to 15 times higher than that which can be achieved with the known water replacement systems.

An arrangement according to the invention for the supply of water to a closed substantially annular pond for the breeding of fish, is characterised in that at the intake to the pond there are arranged guide means for distributing the water in one or more directions, and also there is arranged an exhaust in the bottom of the pond which makes possible an outflow of water from the pond which is always free.

In a preferred construction of the arrangement, the guide means comprises a number of guide plates which are arranged in the ingoing current of water, and each guide plate can be individually regulated as to position in order to conduct respective portions of the water current in a number of directions.

In a further preferred construction, the guide means comprises a unit having a number of branch pipes where the inflowing water can be conducted through, and where each branch pipe is adapted for changing water speed and water quantity.

Preferably, the pond is designed with an upper approximately cylindrical section, and a lower approximately conical section, while the bottom exhaust section of the pond has an approximately cylindrical design.

According to a further preferred construction, there are arranged in the exhaust from the pond a number of guide vanes which are adapted to conduct the rotating water over into a substantially vertical downwardly directed motion. Each guide vane preferably has the form of an upright plate-shaped body, which is arranged in the conical section and/or in the cylindrical exhaust section.

The pond according to the invention is especially suitable for being placed in fresh water or sea water and is closed in being fabricated from an impervious material, such as reinforced plastic cloth, of concrete, steel or the like, and the pond is maintained floating in the water by means of floating bodies.

This pond is preferably used to carry out the aforementioned process.

By the invention there is consequently obtained a pond for the breeding of fish, where the flow of water and the water level can be regulated, at the same time as one always has a free flow of water through the pond. This prevents the collecting of organic waste within the bottom of the pond and hence reduces the chance of an outbreak of sickness among the fish. Furthermore, the regulation obtained is produced totally independently of moveable, mechanical arrangements which require inspection and maintenance, and which are accessible with difficulty below water, such as exhaust valves in deep water, and the like. There is also achieved that overflow pipes which easily lead to the collection of organic waste in the bottom, become totally superfluous. Besides with the present invention, there is achieved a flow of water of the pond which can be regulated and increased, so that the weight of biomass in the form of breeding fish which can be maintained in the pond is increased, thereby in order to attain better yields and economic operation. There is also achieved with the present invention the ability to regulate the level of the water and with that the water pressure within the pond relative to the water level in the sea outside the pond, so that the pressure within the pond exceeds the static pressure on the outside, but without the pond being overfilled so that the latter is drawn more down into the sea than that which is desirable from an operative respect. The invention also provides the possibility to collect organic waste outside the pond, so that this can be collected and removed separately. The invention provides the possibility for additionally increasing the capacity of water flow if this is desirable from an operative respect.

This is achieved, according to the invention, in that sea water is pumped, preferably from deeper water layers, in a feed pipe suitable for the purpose and is introduced into a closed pond, having a desired amount and speed, after which the current of water when it is introduced into the pond can be regulated at the surface level in one or more directions by means of a water distributor in or near the surface of the pond, so that the speed and direction of the current of water supplied can be varied and if necessary divided in several directions, and that finally the water is conducted freely out of the pond through an exhaust in the bottom. The exhaust in the bottom shall according to the invention be directly open to the sea at any time. The circulation, direction, water level and amount of the water distributed within the pond will be able to be regulated by means of the said water distributor from the surface.

The organic waste is collected outside the pond in that a hose is mounted beneath an exhaust sieve which lowermost has a conical design, after which the waste can be removed by for example the use of an ejector pump. Further increase of the water flow capacity of the pond is achieved by installing static guide vanes at the exhaust.

Theoretical calculations and practical tests which are undertaken on a possible embodiment of the invention, have shown that a portion of the water shall be introduced tangentially into the floating, closed pond by means of the water distributor in order to ensure a desired circulation of the water within the pond. Portions of the water can in addition be led radially into the pond in order to reduce the effect of the eddy current in the center and with that increase the flow capacity in the pond, at the same time as it will brake some of the circulation and improve the replacement of the water within the pond. If the circulation develops so as to become too strong and problems with overfilling arise, practical tests have shown that the circulation can be restrained by sending portions of the water in a direction opposite to the direction of circulation. Experience and practical tests have shown besides that on starting up the operation of a pond, where a rapid filling up is desirable, it is favourable to send the bulk of the water tangentially into the pond in the direction of circulation. When the pond approaches its filled up level, the current of water which is introduced into the pond is divided up and the direction is determined according to need, until the pond has achieved a stable, stationary state of operation having a desired water level.

The water level within a floating, closed pond, relative to the water surface outside, will reflect the flow conditions in the pond, and is dependent upon three main factors:

the inflow volume which provides the amount of water supplied per unit of time. In a stationary operative condition, this will correspond to the outflow volume.

The relative difference in density between water in the pond and the water outside. Since sea water from deeper water layers has a higher salinity and hence higher density than sea water further up, the water level within the pond without circulation will be lower than on the outside of the pond. The contribution of the temperature of the water to variations in density is relatively small.

The speed of rotation of the water within the pond. Without rotation restrictions in the pond the level of water within the pond will increase with the square of the speed of rotation. In addition, one will get a curving of the water surface within the pond which is rotationally symmetrical about the center (parabolic).

Since the water exhaust from the pond according to the invention takes place directly to the sea, the possibility is open in addition for conducting larger portions of the current of water from a horizontal circular motion, which in the exhaust will have a form like an eddy current where the water rotates rapidly, to pass over into a downwardly directed vertical motion. This can for example be to done by mounting static guide vanes in the exhaust so that the current of water changes direction downwards through the exhaust. The rotational energy of the water then becomes an almost vertical motion of energy. With that, a reduced effect of the eddy current is obtained at the same time as the water will flow more rapidly out from the pond. The flow of water can hence be increased, so that the biomass in the pond can be increased further.

Another advantage with the invention, which is due to the pond having an open exhaust, is that the dead fish and other solid organic waste can be collected outside and beneath the pond. As required, the accumulated waste can be pumped to the surface for treatment and possible destruction. With that, the stress on the surrounding environment will be reduced.

Further features and advantages of the present invention will be evident from the following description having regard to the accompanying drawings, in which.

Figure 1:
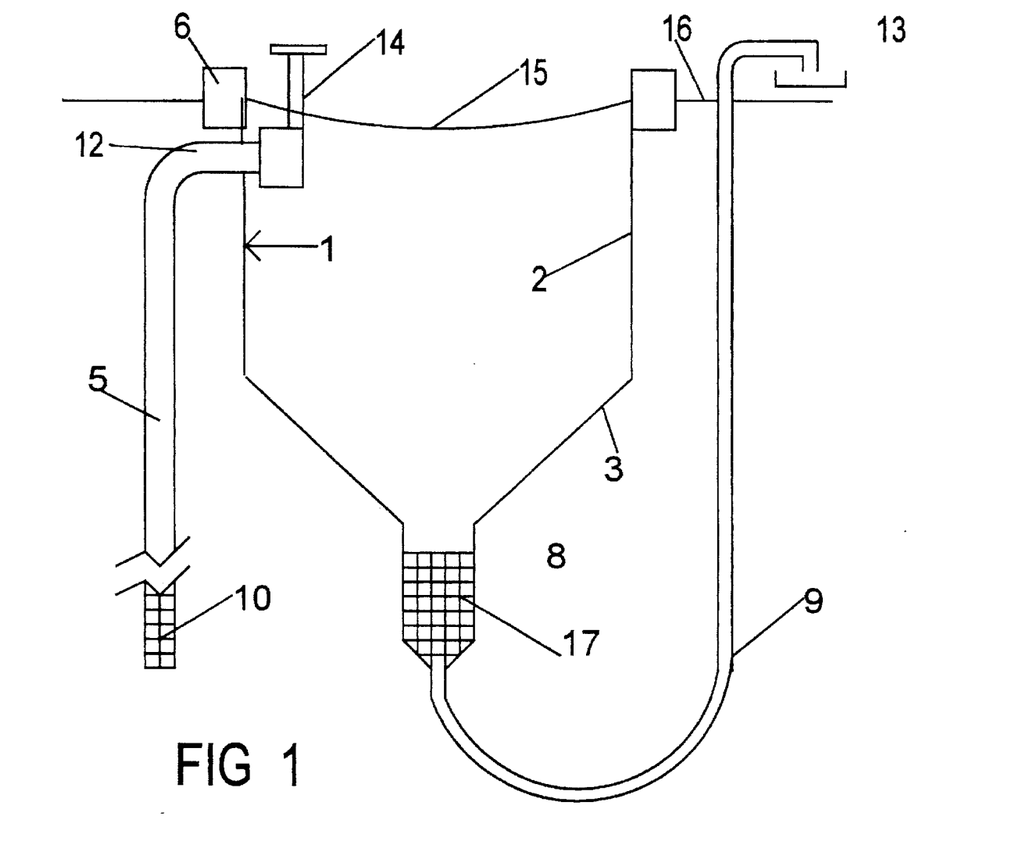
FIG. 1 shows a side section of a floating, closed pond as according to the invention.

FIG. 1 shows a side section of a floating, closed pond 1 which is circular and consists of a peripherally enclosed wall defining an upper approximately cylindrical section 2 and a lower approximately conical narrowed section 3. Sea water is pumped from the deep through a feed pipe 5 by means of a pump (not shown). The supply pipe 5 has an intake grill 10 at the bottom for preventing fish and other beasts of prey from coming from the outside into the pond 1. The feed pipe 5 passes via a buoy, preferably at the upper edge of the pond, over into a horizontal pipe section 12. Thereby the water is led out into the pond 1 in an approximately horizontal flow direction. The water is conducted from the pipe section 12 into the pond 1 through a water distributor 7 and is conducted.

The water out of the pond 1 through an exhaust 8. The water distributor 7 can distribute and disperse the inflowing water in desired water jet directions, by means of a regulating handle 14, connected thereto which is shown here projecting upwardly from the surface 15 of the water within the pond. The water distributor 7 thus acts as a guide means for distributing water in at least one direction into the pond in order to set a volume of water in the pond into rotating motion. The handle 14 thus acts as a means for changing the direction of the flow of water form the distributor 7 to regulate the speed of the rotating volume of water in the pond. The exhaust 8 from the pond 1 is placed approximately in the center of the pond 1. The exhaust 8 is provided with an exhaust grill 17 which is to prevent fish within from escaping, possibly fish and other beasts of prey from coming into the pond 1 from the outside, and dead fish from disappearing in an unintentional way. The exhaust grill 17 connects with a hose 9 through which organic waste in the form of dead fish, feed residues and solid excrements can be conducted up to the surface by means of a pump, (not shown), for further treatment. Tests have shown that an ejector pump functions well and is in a position to pump solid, organic waste up to a suitable collecting tank 13.

The pond 1 has an upper cylindrical section 2 because this provides a favourable flow pattern in the uppermost portion of the pond 1. The lower portion of the pond i is formed as a conical section 3 so as to provide a continuous reduction of the diameter of the pond down towards the exhaust 8. An angle on the walls of the conical section 3 of the pond 1 of about 45° or more relative to the horizontal plane has proved by experience to be favourable for organic waste from the operation of the pond 1 to be able to be led downwards easily in the direction of the exhaust 8, in order thereafter to be able to be picked up and pumped away through the hose 9. The exhaust section 8 has an essentially cylindrical form.

FIG. 1 also shows that with a slight curvature the water surface 15 within the pond 1 will assume a parabolic curvature as a result of the rotation of the water. The water level in the drawing is shown to lie above the water level 16 of the sea outside. The pond 1 shall be impervious to the sea around and can be fabricated from various materials for example steel, concrete or flexible, strengthened reinforced plastic cloth. If flexible cloth is chosen, this will become stretched to its desired form because the pressure within the pond can be maintained greater than the pressure of the sea outside. The amount of buoyancy in the form of floating bodies 6 will be dependent upon the specific gravity of the pond 1 in water and the desired height of the surface 15 of water within the pond, relative to the water surface 16 outside, during operation.

Figure 2:
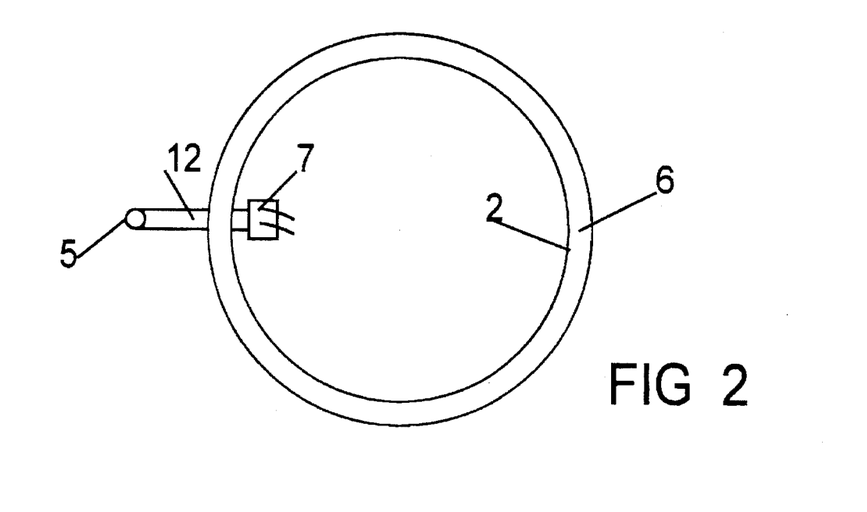
FIG. 2 shows a plan view of the pond at the surface.

FIG. 2 shows a plan section of the pond 1 at the surface. The pond 1 is suspended in the floating bodies 6 at the surface. The horizontal feed pipe 12 is shown to lead within the pond approximately radially, but can also be introduced into the pond at another angle. The water distributor 7 is shown mounted on the inside of the pond, where it can distribute the current of water and with that regulate the water flow in the pond 1.

Figure 3:
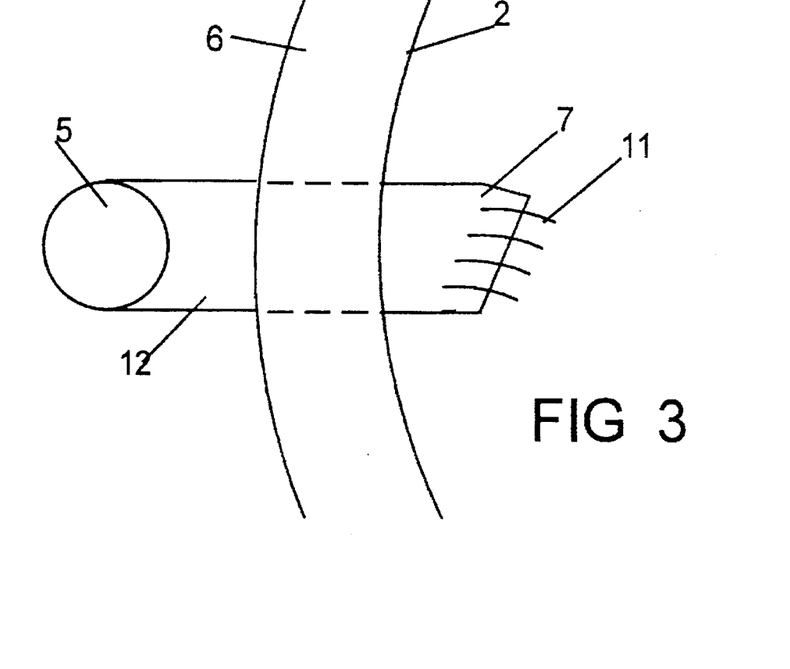
FIG. 3 shows in part a plan view of the water intake to the pond and a possible construction of a water distributor.

FIG. 3 shows a plan section of the water intake to the pond 1 and a possible construction of the water distributor 7. In the drawing the water distributor 7 is shown provided with one or more wings 11 or sluice plates which are adapted to split up and distribute the water current to the pond 1 in one or more well-defined branch currents. In the Figure the wings 11 are shown arranged as a parallel series of mutually parallel wings. The wings can be turned away from the illustrated mutually parallel position about respective vertical pivot axes and thereby distribute the water currents in dissimilar directions.

Figure 5:
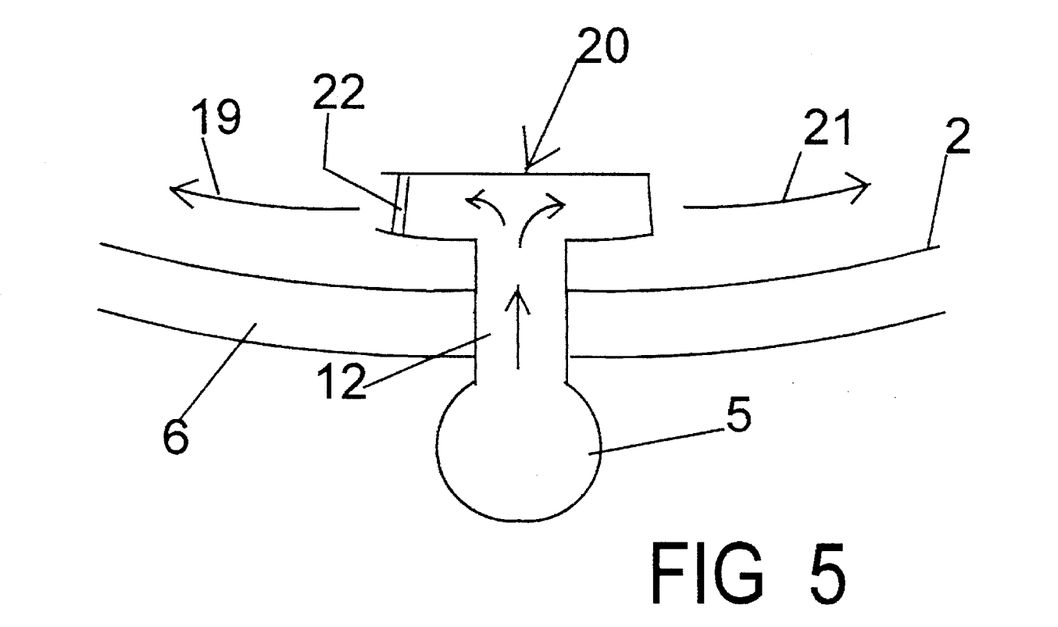
FIG. 5 illustrates a part cross-sectional view of a modified arrangement for distributing water within a tank in accordance with the invention.

In an alternative construction, the water distributor 7 can comprise a pipe which can be turned sequentially to conduct the water within the pond in several direct directions. Such a pipe can further be designed, as shown in FIG. 5, wherein like reference characters indicate like parts as above, with a branching off which conducts the water in two main directions. The pipe 5 can for example have an approximate T shaped section 20 defined in part by a horizontal pipe section 12 which can conduct the water in two approximately opposite directions. For example 60% of the water current can be conducted through the branch which leads in the same direction as the water rotation as indicated by an arrows 19, while 40% of the water is conducted through the other branch in a direction opposite the water rotation as indicated by an arrow 21. This water distribution through the branching off pipes can be carried out by choking, or if desired wholly closing off, the one branch, for example by setting up closing sluices 22 in the branch pipe. The regulation of the condition of flow in the pond can be carried out manually by an operator from the surface. Portions of the water current can also be sent if desired with a vertical speed component into the pond.

Moreover the afore-mentioned water distribution can be carried out by the use of otherwise known technical solutions.

Figure 4:
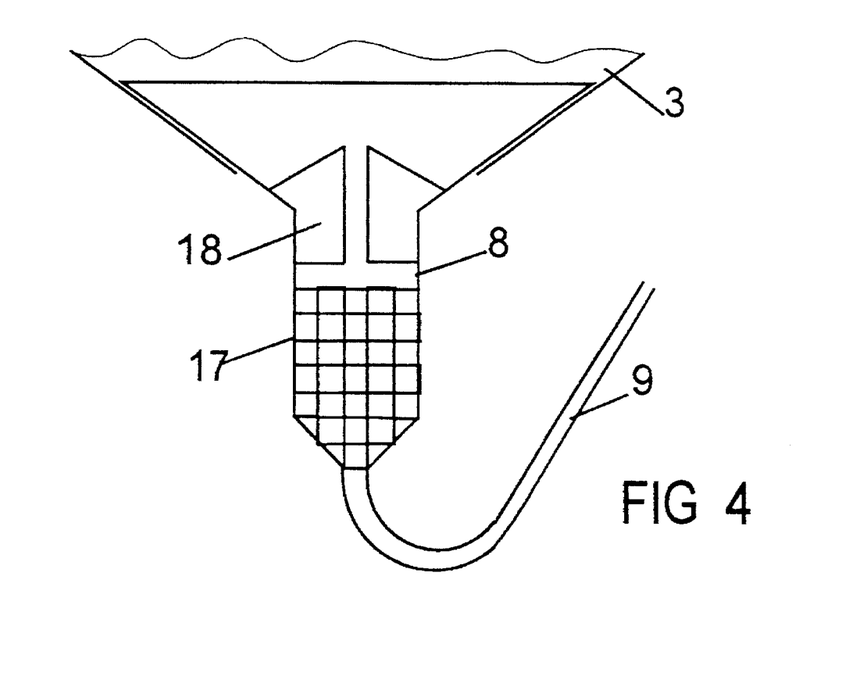
FIG. 4 shows in a side section an alternative construction of a pond according to the invention.

FIG. 4 shows a side section of an alternative construction of the exhaust 8 from the pond, something which also makes possible the collection of organic waste outside the pond 1. In this alternative construction, static guide vanes 18 can be mounted at the exhaust 8. The lower portion of the exhaust 8 may also have static guide vanes 18. The lower portion of the exhaust 8 is mounted on an exhaust grill 17. The lower portion of the grill 17 will have an angle which conducts dead fish and other organic waste down towards the bottom of the grill 17. The guide vanes 18 will be curved so that the water which circulates as an eddy current over and into the exhaust 8 is led from flowing in a rotating motion to flowing vertically downwards. The guide vanes 18 comprise essentially vertically upright plate-shaped bodies which can be arranged in the conical section 3 and/or in the cylindrical underlying section. The guide vanes 18 will thus promote the free vertical outflow of water through the exhaust 8.

We claim:

1. A process for supplying water to a peripherally closed pond for the breeding of fish, said process comprising the steps of:

directing a flow of water into the pond to set the volume of water in the pond into a rotating motion;

regulating the speed of the rotating volume of water in the pond to control the level of the water in the pond; and exhausting water from a bottom portion of the pond in a free flowing manner.

2. A process as set forth in claim 1 wherein one portion of the flow of water is directed in one direction into the pond and a second portion of the flow of water is directed in a counter-current direction to regulate the speed of the rotating volume of water in the pond.

3. A process as set forth in claim 1 wherein the water flow directed into the pond is at a rate of 100 cubic meters per minute for a volume of water in the pond of 1300 cubic meters.

4. A process as set forth in claim 1 wherein the pond is circular.

5. A process as set forth in claim 4 wherein the flow of water is rotated through the pond from a top inlet thereof to the bottom portion thereof.

6. An apparatus for breeding fish comprising a pool for floating in a body of water, said pool, having an impervious wall of annular shape to contain a volume of water therein, said wall defining an upper section and a lower narrowed section;

a guide means for distributing water in at least one direction into said upper section of said pond to set a volume of water in said pond into rotating motion; and an exhaust means at a bottom of said lower section of said pond for a free outflow of water therefrom directly into the surrounding body of water.

7. An apparatus for breeding fish;

a pond having a peripheral impervious wall defining an upper section, a lower narrowed section and an exhaust extending centrally of and from said lower section for a free flow of water therefrom;

a water distributor at an upper portion of said pond for directing a flow of water into said pond to set a volume of water in said pond into rotating motion; and means connected to said distributor for changing the direction of the flow of water from said distributor to regulate the speed of the rotating volume of water in said pond.

8. An apparatus for breeding fish comprising:

a pond having an impervious wall defining an upper cylindrical section, a lower conical section and an exhaust extending centrally of and from said conical section for a free flow of water therefrom;

a water distributor at an upper portion of said pond for directing a flow of water into said pond to set a volume of water in said pond into rotating motion; and means connected to said distributor for changing the direction of the flow of water from said distributor to regulate the speed of the rotating volume of water in said pond.

9. An apparatus as set forth in claim 8 wherein said water distributor includes a plurality of sluice plates for distributing the flow of water into said pond in a plurality of branch currents.

10. An apparatus as set forth in claim 9 wherein said sluice plates are vertically disposed in parallel relation to each other.

11. An apparatus as set forth in claim 9 wherein said sluice plates are vertically disposed to pivot about respective vertical axes.

12. An apparatus as set forth in claim 8 which further comprises a plurality of guide vanes in said pond for directing water from said conical section vertically downwardly into said exhaust.

13. An apparatus as set forth in claim 12 which further comprises a grill in said exhaust for preventing the passage of fish.

14. An apparatus as set forth in claim 12 which further comprises a collecting tank for disposition outside said pond and a hose connected to said exhaust for conducting water and waste therethrough to said collecting tank.

* * * * *

UNITED STATES PATENT AND TRADEMARK OFFICE
CERTIFICATE OF CORRECTION

PATENT NO. : 5,660,141
DATED : Aug. 26, 1997
INVENTOR(S) : Karsten Aubert, et al.

It is certified that error appears in the above-indentified patent and that said Letters Patent is hereby corrected as shown below:

Column 5, lines 65, cancel "b"

Column 8, line 50, after "ducted" insert -out of the pond 1 through an exhaust 8-

Line 51, cancel "The water ... exhaust 8."

Line 60, change "form" to -from-

Column 10, line 53, after "pool" cancel -,-

Signed and Sealed this

Eleventh Day of November, 1997

Attest:

BRUCE LEHMAN

Attesting Officer

Commissioner of Patents and Trademarks